Jan. 26, 1965    M. E. JACOBS ETAL    3,167,144
SCALE

Filed Sept. 11, 1963    4 Sheets-Sheet 1

INVENTORS
MAXWELL E. JACOBS
CHARLES ANSELMO
BY
Kane, Dalsimer and Kane
ATTORNEYS

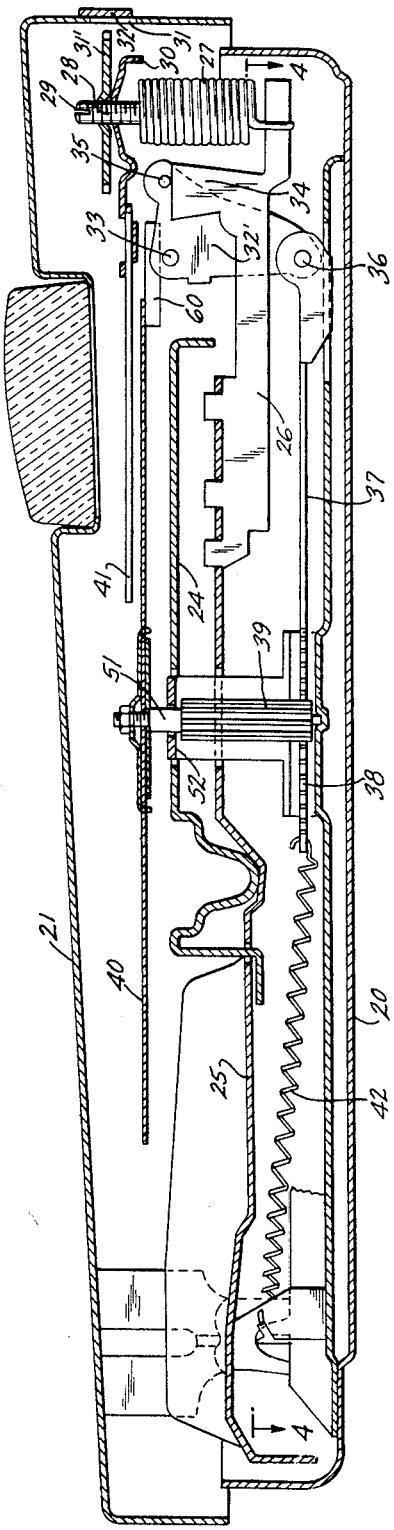
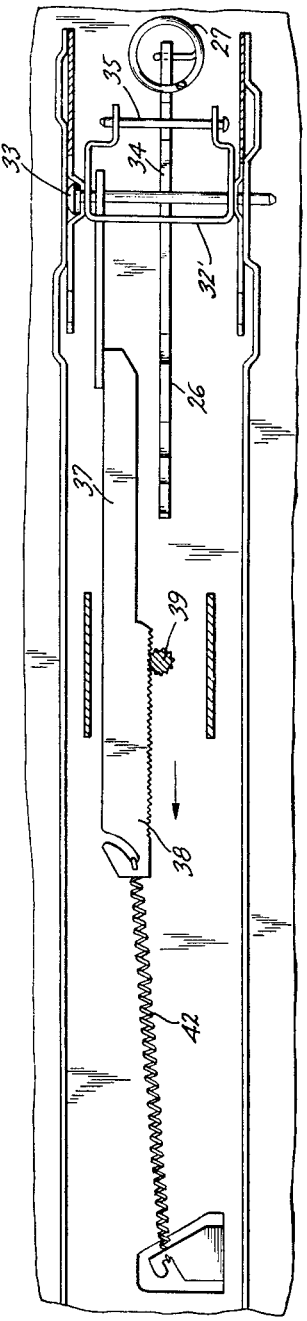

Jan. 26, 1965   M. E. JACOBS ETAL   3,167,144
SCALE
Filed Sept. 11, 1963   4 Sheets-Sheet 3
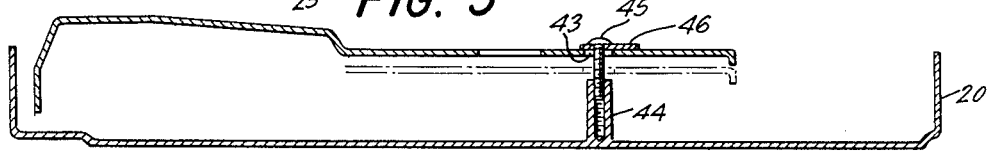
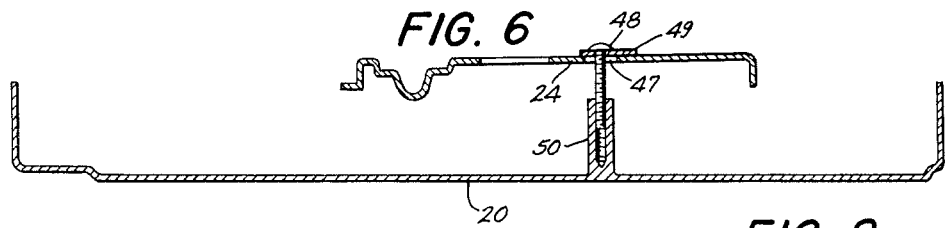
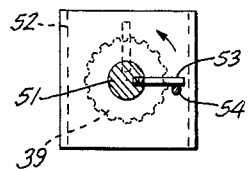
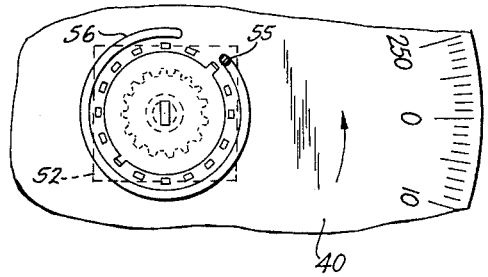
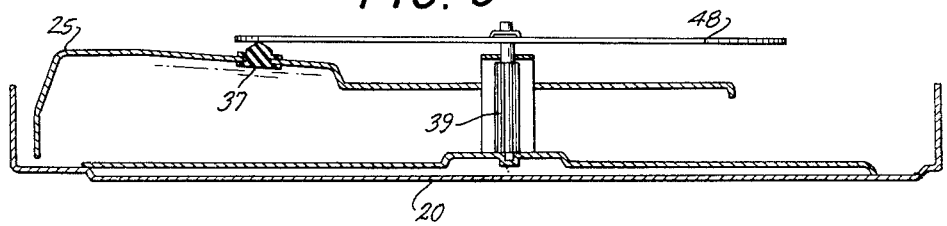
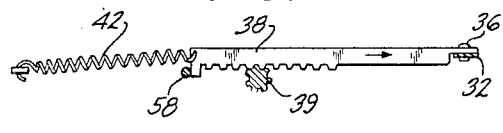
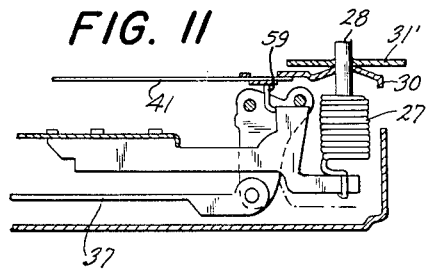
INVENTORS
MAXWELL E. JACOBS
CHARLES ANSELMO
BY
ATTORNEYS

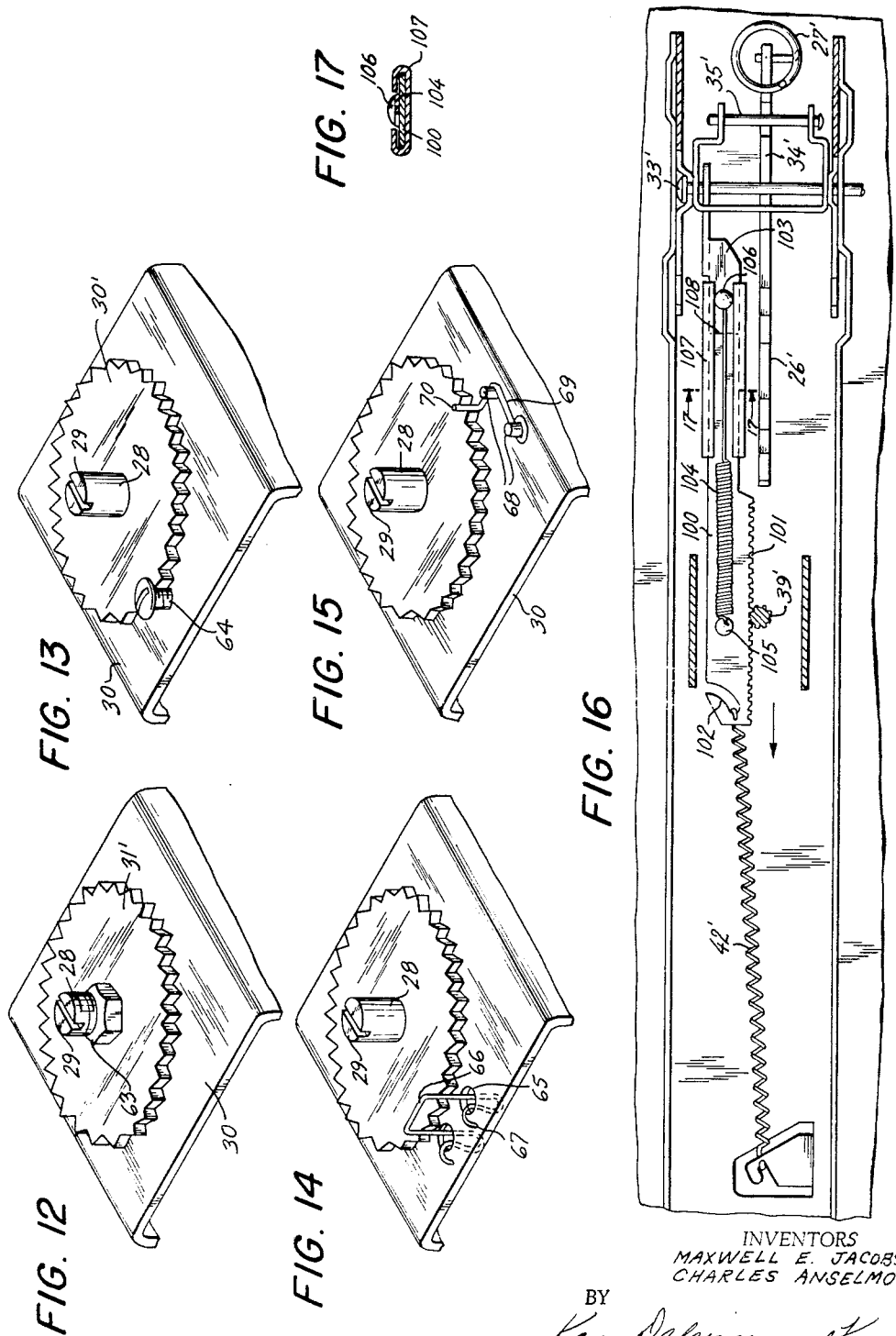

United States Patent Office 3,167,144
Patented Jan. 26, 1965

3,167,144
SCALE
Maxwell E. Jacobs and Charles Anselmo, Brooklyn, N.Y., assignors to Detecto Scales, Inc., Brooklyn, N.Y., a corporation of New York
Filed Sept. 11, 1963, Ser. No. 308,232
14 Claims. (Cl. 177—225)

This invention relates to a structurally and functionally improved scale and in its more specific aspects involves a scale of the bathroom type.

It is a primary object of the invention to design a scale the parts of which may be adjusted and correlated at the time of manufacture so that the user in observing the weight registered by the scale may fully rely on this reading and not be subject to the annoyance and reading inaccuracies which result where a scale involves an adjustment to be made by the ultimate user in order to register a zero weight when no load is imposed on the scale platform.

A further object is that of providing a simple and economical structure by means of which the desired results will obtain and in which the workman in assembling and testing the scale will be able to follow substantially the technique as heretofore practiced in scales embodying adjusting mechanisms to be operated by the user.

With these and other objects in mind, reference is had to the attached sheets of drawings illustrating practical embodiments of the invention and in which:

FIG. 3 is a sectional side view of the complete scale;

FIG. 4 is a fragmentary plan view taken along the line 4—4 in the direction of the arrows as indicated in FIG 3;

FIG. 5 is a sectional side view showing one form of structure in accordance with the present teachings;

FIG. 6 is a similar view illustrative of another form of such structure;

FIG. 7 is a transverse sectional view taken through the pinion shaft of the scale and showing a desired structure in association therewith;

FIG. 8 is a fragmentary plan view of the dial and the elements adjacent thereto again embodying a structure within the scope of the present teachings;

FIG. 9 is a view similar to FIGS. 5 and 6 but showing an alternative structure;

FIG. 10 is a sectional plan view of a desired structure which may be associated with the scale rack;

FIG. 11 is a fragmentary sectional side view of a structure achieving the desired results and associated with the bell crank element of the scale;

FIGS. 12 to 15, inclusive are fragmentary perspective views showing locking structures for preventing movement of the adjusting knob after the latter is properly positioned;

FIG. 16 is a fragmentary plan view similar to the view of FIG. 4 of another form of rack member; and FIG. 17 is a sectional view taken along the line 17—17 in the direction of the arrows in FIG. 16.

Figure 1:
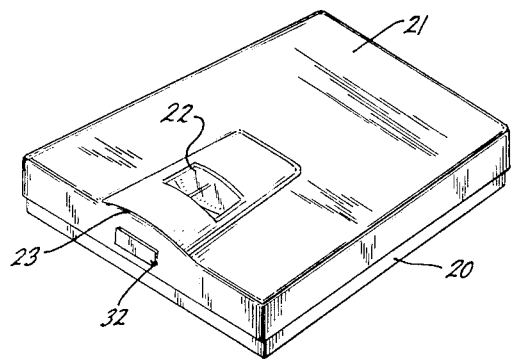
FIG. 1 is a perspective view illustrative of one type of scale embodying the present improvements.
Figure 2:
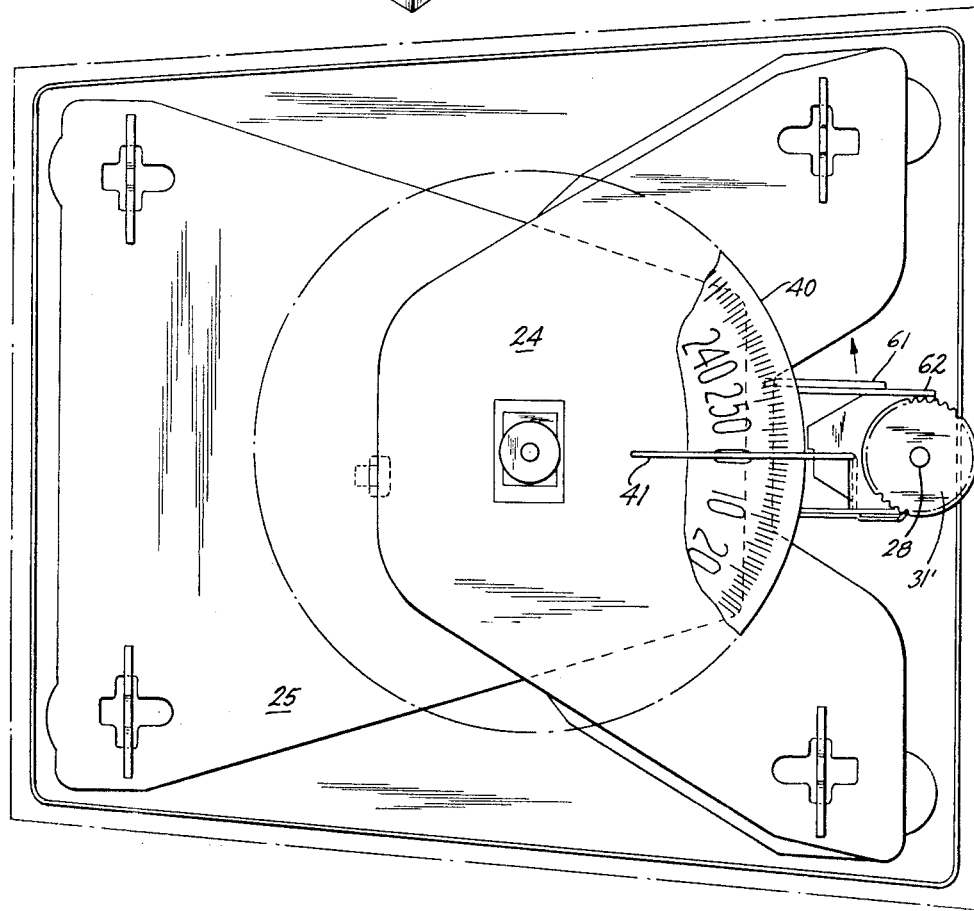
FIG. 2 is a plan view of that scale with the platform removed and only a fragment of the dial illustrated in order to disclose underlying structures.

Referring primarily to FIGS. 1 to 4 inclusive, the numeral 20 indicates the scale base above which is supported a platform 21. The platform in the present exemplification is formed with an aperture or window 22 through which the registering mechanism may be observed. Conveniently the area of the platform within which this aperture is provided may be upwardly bulged as indicated at 23. As will be well understood, the foregoing is merely generally illustrative of one type of scale herein contemplated. The invention is equally applicable to scales presenting radically different configurations and in which a platform is movably supported by a base through the medium of rockingly mounted levers, movements of which are resisted by a spring or springs. Therefore, except where otherwise indicated by the appended claims the present illustrations are not to be considered as limiting the scope of the invention.

Thus, the numeral 24 indicates a short lever of any proper design. This lever bearing against a long lever 25 to which a nose piece 26 is attached to provide an extension thereof. As in conventional design the short and long levers are each supported at an end by resting on posts projecting upwardly from base 20 at the corners thereof. Hence long lever 25 is supported by two posts 20' (only one of which is shown in FIG. 3) along its edge 25' and short lever 24 is supported along its edge 24' by two posts 20'', not shown, one at each corner. Platform 21 is supported by four downwardly projecting posts 21' attached thereto resting in rocker supports 21'' which are supported in slots 24a and 25a formed in the short and long levers respectively. Springs, not shown in the figures may be attached between base 20 and platform 21 in the conventional manner to yieldingly urge the base and the platform toward each other.

The outer end of nose piece 26 is connected to the lower end of a spring or counterbalance 27. A bolt involves a head portion engaged in any acceptable manner with the convolutions of the spring 27 adjacent its upper end and from which bolt a threaded stem 28 extends. The outer end of this stem is preferably formed with a slot or equivalent surface configuration such that by means of a screw driver or similar implement the bolt may be turned and thus adjust the position of its head with reference to the convolutions of spring 27; such slot being indicated at 29.

A support 30 forms a fixed part of the scale assembly and presents an opening through which stem 28 extends. The threads of stem 28 are engaged by an adjusting knob or disc 31'. The latter bears against a support 30. The encasing portion of the assembly adjacent this knob is formed with an opening 31 which is initially unobstructed. As hereinafter brought out, the opening will be closed by a plate or equivalent element 32 conveniently welded or otherwise secured in place. It is well understood with respect to adjusting means of this nature two functions are capable of achievement. The first involves shifting bolt 28 with reference to the convolutions of spring 27 to thus increase or decrease the resistance which it offers to the platform being moved towards the base. The adjustment provided by rotating knob 31' around stem 28 results in a bodily shifting of the spring, the levers and the parts connected therewith and has as in scales produced up to the present time been employed by the ultimate user to bring the relatively movable parts of the registering mechanism to a zero condition with no weight upon the platform.

As again typifying conventional procedure a bell crank 32' may be rockingly supported as at 33 by a fixed portion extending from base 20. An extension 34 of nose piece 26 bears against a pin 35 carried by an arm or extension of the bell crank; the second arm or extension of the latter being pivotally connected as at 36 to a link 37 terminating in a rack portion 38. The teeth of the latter bear in operative relationship against the teeth of a pinion 39 which has a vertical axis and at its upper end mounts a dial 40 the graduations of which register with a pointer or indicator 41.

The bell crank is pivotally mounted at 33 with pin 35 bearing against extension 34 of the nose piece. Spring 42 normally urges link 37 to the left in FIGS. 3 and 4 but is unable to move the assembly to the left in the absence of a downwardly directed force on plate 21, because of the abutment of pin 35 with the nose piece. Upon the application of weight to plate 21 the nose piece is moved down allowing spring 42 to move rack 38 to the left and thus correspondingly rotate pinion 39 to turn dial 40 proportionately to the weight applied. It is apparent that in lieu of employing a flat dial which is rotated with respect to a fixed pointer 41 and in which movement occurs on the part of that dial in a horizontal plane, that functionally corresponding registering elements of diverse forms as present in the prior art might be utilized.

In scales of this type as heretofore constructed it is well known that after the parts are assembled, the manufacturer subjects the mechanism to a series of tests so that it will accurately indicate weight values over the capacity of the scale. These tests involve applying various pressures to the platform 21 or the parts supporting the same and adjusting the bolt stem 28 with reference to the body of spring 27 so that the desired result is achieved. Turning of knob or disk 31' results in a further adjustment.

With no weight on the platform and with the scale in the hands of the user it has been customary for the latter to turn disk or knob 31' and in this manner bring the registration of the dial and pointer mechanism 40-41 to a zero indication. Such indication, however, is quite usually inaccurate because the springs 27 and 42 in returning the mechanism to a "zero" condition may have shifted the parts either beyond such position or else to a point short of the same. In both instances the registering mechanism will therefore give an improper indication as a weight load is imposed on the platform because a weight value will be registered which is either over or under the true weight. Upon removing the load from the platform the springs of the scale will again return the parts of the mechanism towards a "zero" condition. However, if such a condition is actually registered then due to the error as just traversed the weight value of the next load imposed upon the scale will be incorrectly registered. Otherwise by further adjustment of the knob 31' correction may be made which in many instances will magnify the errors of ultimate registration which would have occurred under conditions prior to making the last adjustment.

To overcome these difficulties and according to the present invention, the terminal portion of the assembly line producing this scale will involve an adjustment of the knob or disk 31' bringing the weight value indication of the registering mechanism to a zero condition. However, at this point spring 27 will still have a potential contraction force which may be on the order of one or two pounds as indicated by the registering mechanism. The fact that the latter registers a zero condition will be of no consequence because scales of this character will register a weight value of, for example, 0 to 260 pounds. Where weights less than 20 pounds are involved, scales of different types are involved. Even in the case of children, weights of from 30 pounds upwards are present. Accordingly, the graduations of the registering mechanism beginning at zero, for example, could have an error of two pounds which will be graduated over the first 25 pounds or perhaps 5 pounds of registry indication to provide for a correct weight value from 25 pounds upwardly. Obviously with the spring incorporating a potential such that it is tending to elevate the scale platform even with the registering mechanism indicating a zero condition a stop factor at this point will assure that the user will not be disturbed by observing a registration over or below this and accordingly desiring to adjust the parts.

Stop factors of diverse characters may be employed. For example, as in FIG. 5 long lever 25 may be provided with an opening 43 below which base 20 is furnished with a bored and threaded extension 44 fixed with respect to it. The shank of a bolt 45 has its threads engaging with these bore threads and extends above lever 25. A plate or arm 46 of an area greater than opening 43 is carried by the bolt below its head and overlies lever 25 to thus limit the upward swinging of the end of the latter. According to the adjustment of the bolt with reference to the base this limit or stop will correspond, for example, to a true weight value on the platform of two pounds with a simultaneous zero indication on the part of the registering mechanism. The same result is achieved by forming the short lever 24 with a corresponding opening 47 through which the shank of a headed bolt 48 extends to carry a stop plate or arm 49 bearing in contact with the upper face of that lever. As shown, the shank of the bolt has its threads engaging the threads provided in the bore face of a stud or extension 50 projecting upwardly from base 20.

As in FIG. 7 the shaft 51 of pinion 39 may extend upwardly through pinion bridge 52 and support an arm 53 to rotate with it. A stop in the nature of a pin 54 or other suitable element is conveniently carried by bridge 52. It is apparent that when these parts engage further movements of the pinion, rack, bell crank, springs and levers will be interrupted. With such interruption or stopping occurring at a point where the registering mechanism is in zero position and the remaining parts of the assembly under the potential remaining in the springs are tending to move the parts beyond this position, a condition is created such that with removing the weight from the platform a positive stop structure is provided which will in no way interfere with subsequent weighing operations.

If it is not desired to use this structure then pinion bridge 52 may support a pin 55. The latter extends through an arcuate slot 56 formed in dial 48. It is obvious that when the end of the slot engages the pin 55 a positive stop structure exists. Accordingly, the scale mechanism will have its movements arrested at a point short of that at which the contraction of the springs would normally move its parts.

If it is not desired to employ a positive stop but rather to resort to a friction structure to arrest movement of the parts at a desired point then, for example, lever 25 may carry a stud 57 of rubber or equivalent material which extends above the same. The underface of dial 48 will occupy a position above this element when the levers of the scale are depressed under a weight load. However, as lever 25 rises with the load on the platform relieved, element 27 will move into contact with the lower face of dial 48. The latter being secured to the pinion so that it is incapable of shifting with respect to the latter, it will function as a braking surface when contacted by element 57. Again a stop structure is furnished which will arrest movement of the parts prior to their reaching zero positions as governed by contraction of the spring or springs.

A stop which may take the form of a pin 58 can conveniently arrest the movement of rack 38 as shown in FIG. 10. Again it is apparent that the movements of the parts are arrested at a desired point short of that at which the force of the spring or springs is exhausted incident to returning the platform to a zero position. The same is true of the structure shown in FIG. 11 in which a stop pin 59 may be engaged by bell crank 32' to arrest movement of the latter in a position such that the spring or springs will still be under a condition of tension.

A preferred form of structure will involve an arrest of relative movement of the parts in a group of mechanism where movements of maximum scope occur. Thus, generally, structures such as are shown in FIGS. 7, 8, 10 and 11 are usually less critical and more effective than those shown in FIGS. 5 and 6. Likewise the structures present in FIGS. 2 to 4 offer in many respects the most desirable arrests or stops. In those views it will be seen that the dial may carry on one of its faces a stop member 60.

Stop member 60 is a resilient member which as shown will encounter a portion of the weighing spring support to stop the dial short of the true zero in accordance with the manufacturer's design. This obviously will travel with the dial if the latter be the rotatable member of a registering mechanism. Otherwise the stop will travel with the pointer of that mechanism. In any event this member will in no way interfere with the movements of the element supporting it even if those movements embrace a travel of just short of 360°. However, a fixed portion of the scale, as for example, parts 62 connected to supporting portion 30 may provide an obstruction to register movement as a weight is removed from the platform and as the registering mechanism indicates a zero condition. It is obvious that so applied maximum relative movements of the parts with respect to each other is present and therefore an arrest in movement will occur at precisely the point desired by the manufacturer.

Regardless of the stop employed the manufacturer will provide for an adjusting station at the end of an assembly line if the latter is used. At that station, and as afore brought out, by shifting bolt stem 28 with respect to spring 27 weight value indications accurately reflecting the load imposed on the platform will be presented by the registering mechanism; fine adjustments being feasible by rotating of knob or disk 31' with respect to stem 28. After adjustment over the entire range of the scale so that accuracy is assured from, for example, 30 to 260 pounds, the adjusting mechanism should be locked and rendered inaccessible to the ultimate user. Obviously, as the platform is applied in a conventional manner to overlie the beams or levers and the base, it is locked to prevent its removal from this position. Accordingly, the end of stem 28 will be invisible and out of reach of the ultimate user. Also access to the disk or knob 31' is prevented by closing opening 31, for example, by means of plate 32 and securing the latter against detachment. Therefore, again the ultimate user will have no access to the adjusting knob or disk.

Diverse arrangements may be resorted to to lock the adjustment between the knob and stem 28. Certain of these have been shown in FIGS. 12 to 15, inclusive. In the first of these a lock nut 63 may be supported on the threads of stem 28. Accordingly, after final adjustment of the disk or knob 31' this nut may be tightened to lock the parts against further movement. In FIG. 13 support 30 may be provided with a drilled and capped opening receiving the threaded stem 64 of a screw which will extend between the indentations defining the peripheral edge zone of knob 31'.

A readily attachable and removable fastening element may likewise be employed to lock disk or knob 31' against movement. This has been shown in FIG. 14 in which the support member 30 is formed with a pair of openings 65 adjacent the periphery of knob 31'. A U-shaped clip 66 having its arms folded back on themselves and extended outwardly as at 67 involves a spacing such that those arms may be received within openings 65. So received projection of the clip will be limited due to the extended portions 67 and that clip will be retained against movements due to the reverse portions of the arms yieldingly bearing against the edges of the openings. The arms proper will extend into recesses defined by the knob serrations. As in FIG. 15 a pair of posts 68 may extend upwardly from support 30 and mount as well as brace a section 69 of spring wire the end 70 of which bears against the peripheral edge of knob 31'. Therefore, this end portion will function as a pawl riding against the ratchet edge of the knob or disk to retain the latter against movements.

It is apparent that innumerable equivalent fastening expedients may be resorted to in addition to those shown in FIGS. 12 to 15, inclusive. For example, solder or adhesive might be employed to lock the knob or disk against rotation with respect to stem 27. Also the end portion 29 might be eliminated or zeroed in to prevent a turning of the stem. In all events it is apparent that the operator at the final station of the assembly line will be free to adjust the knob with reference to the stem and the latter with reference to the convolutions of the spring 27. Also it is definitely preferred that after the adjustment has been completed any opening 31 affording access to these parts should be blocked as, for example, by a plate 32. Therefore, the ultimate user will not have access to the mechanism; it being borne in mind that in accordance with conventional technique platform 21 is secured against removal from base 20 so that the interior assembly may not be reached.

Under these circumstances the scale parts will— throughout the life of the scale—return to a stop or arrested position upon the platform being relieved of weight. In that position the registering mechanism will indicate a zero condition. Obviously, if the indicia on the registering part of the scale is interrupted at a point short of zero an equivalent condition will prevail insofar as the functions of the apparatus and the observations of the ultimate user are concerned.

In FIGS. 16 and 17 an improved rack system is shown. It is noted that FIG. 16 is similar to FIG. 4 with like parts indicated by like numerals followed by a prime. Hence in the embodiments of FIG. 16 the bell crank is pivotally mounted at 33', with pin 35' bearing against extension 34' of the nose piece 26'. The outer end of the nose piece is connected to the lower end of spring 27' and spring 42' is normally urging the link system to the left.

In the embodiment of FIG. 16, however, in the link system the rack is split in half with one half indicated by the numeral 100 and formed with teeth 101 and slot 102 to which an end of spring 42' is connected. Teeth 101 engage pinion 39' in the manner of the teeth of rack 38 engaging pinion 39 in FIG. 4. The second half of the rack is indicated by the numeral 103 and rack halves 100 and 103 are joined by tension spring 104 which is attached at one end to rack half 100 by means of rivet 105 and to rack half 103 by rivet 106 which also affixes open channel fastener 107 to rack half 103. A portion of rack half 100 is disposed within channel 107 and movable longitudinally therein spring 104 yieldingly urges rack halves 100 and 103 into abutment at 108.

In the embodiments of FIGS. 16 and 17 spring 42' normally urges the two part rack assembly to the left but is unable to move the assembly to the left in the absence of a downwardly directed force on plate 21, because of the abutment of pin 35' with the nose piece. Upon the application of weight to plate 21 the nose piece is moved downwardly allowing spring 42' to move the rack assembly to the left and thus correspondingly rotate pinion 39' proportionately to the weight applied.

When the weight is removed from plate 21 the split rack assembly moves rapidly to the right and due to the inertia in the system rack half 103 tends to move to the right more rapidly than rack half 100. Spring 104 allows the parts to separate and to come together at the end of the travel to the right thereby effecting a cushioning action.

Thus, among others, the several objects of the invention as aforenoted are achieved. Obviously numerous changes in construction and rearrangement of the parts may be resorted to without departing from the spirit of the invention as defined by the claims.

We claim:

1. In a scale of the type having a base, a platform supported above the base, a spring yieldingly urging said platform away from said base, the exhausted length of said spring determining the maximum distance between said base and said platform, a measuring mechanism including relatively movable parts operatively connected to said base and said platform to measure the distance said platform is from said base, a registering means providing an indication of the distance said platform is spaced from said base, that improvement in combination therewith consisting of arresting means to arrest movement of said measuring mechanism prior to said spring attaining its exhausted length after application of stress and said registering means providing a predetermined indication during actuation of said arresting means independently of said measuring mechanism.

2. In an assembly as defined in claim 1, said measuring mechanism comprising a member presenting indicia embracing a scale of weight values from zero upwardly and indicating means aligning with such indicia, and said parts indicating a zero value upon the movement of said measuring mechanism being arrested.

3. In an assembly as defined in claim 1, means for adjusting the spring to increase and decrease the resistance it offers to said platform movement at zero value and means for rendering said adjusting means inoperative.

4. In an assembly as defined in claim 1, movable adjusting means within said casing and connected to said spring, said adjusting means being disposed adjacent an outer surface of said assembly and to one side of an initially unobstructed opening in that surface affording access to said adjusting means and means for substantially permanently obstructing said opening.

5. In a scale as defined in claim 1, said arresting means comprising elements providing a stop and an extension engageable therewith and one of said elements being connected with a movable part of said measuring mechanism.

6. In a scale as defined in claim 1, supporting means supporting said platform above said base, said arresting means comprising a beam forming a part of said supporting means and provided with an opening and a member extending through said opening to engage with a beam surface to stop movement of said beam.

7. In an assembly as defined in claim 1, said arresting means comprising a rotatable pinion forming a part of said registering means and stop means connected to said pinion for limiting its rotation.

8. In an assembly as defined in claim 1, said arresting means comprising a stop element forming a fixed part of said assembly and projecting through a slot formed in a rotatable dial providing a part of said registering means and said element engaging with an end of said slot to limit rotation of said dial.

9. In an assembly as defined in claim 1, said arresting means comprising parts presenting surfaces providing a brake and said parts being carried by portions of said assembly to move with such portions and into engagement with each other.

10. In an assembly as defined in claim 1, said arresting means comprising a rack connected to operate said registering means and a stop element engageable with said rack to limit its movements.

11. In an assembly as defined in claim 1, said arresting means comprising a movable connecting member extending between said registering means and said spring and means functioning as a stop to limit movement of said member.

12. In an assembly as defined in claim 1, said measuring mechanism comprising a member presenting indicia embracing a scale of weight values from a predetermined value upwardly and indicating means aligned with such indicia and said parts registering a zero value below said predetermined value upon the movement of said measuring mechanism being arrested rendering the scale accurate throughout its range above said predetermined value.

13. In an assembly as defined in claim 1, said measuring mechanism including a pivotal member and a rack attached thereto maintained in a normal position by a portion thereof abutting a member movable with said platform and a spring member yieldingly urging said rack member and said pivotal member out of normal position proportionately to the movement of said platform downwardly under the influence of weight thereon removing said abutting member, said rack member being formed in two parts joined with a tension spring allowing separation of said parts for independent movement returning said rack to normal position upon the movement of said platform upwardly upon the removal of such weight therefrom.

14. In an assembly as defined in claim 13, said rack parts being aligned with a channel member attached to one part and the remaining part movable longitudinally in said channel member.

References Cited in the file of this patent
UNITED STATES PATENTS

| | | |
|---|---|---|
| 1,238,370 | Wetzel | Aug. 28, 1917 |
| 1,305,780 | Dilks | June 3, 1919 |
| 1,811,831 | King | June 23, 1931 |
| 2,570,321 | Christoffer | Oct. 9, 1951 |
| 2,766,038 | Weber | Oct. 9, 1956 |